Sept. 15, 1964 S. A. PROCTER 3,149,204

SELF-ADJUSTING AFC SYNCHRONIZING CIRCUIT

Filed April 24, 1962 2 Sheets-Sheet 1

INVENTOR.
SAMUEL A. PROCTER

BY

Ooms, McDougall & Hersh
ATTORNEYS

SELF-ADJUSTING AFC SYNCHRONIZING CIRCUIT

Filed April 24, 1962 2 Sheets-Sheet 2

INVENTOR.
SAMUEL A. PROCTER
BY
Ooms, McDougall & Hersh
ATTORNEYS

United States Patent Office 3,149,204
Patented Sept. 15, 1964

3,149,204
SELF-ADJUSTING AFC SYNCHRONIZING CIRCUIT

Samuel A. Procter, 1936 Cedar Lake Blvd., Minneapolis 16, Minn.

Filed Apr. 24, 1962, Ser. No. 189,845
12 Claims. (Cl. 178—69.5)

This invention relates to a new and improved synchronizing circuit which is especially useful for television receivers, but is applicable generally to equipment in which it is desired to synchronize a local oscillator or the like with a received signal, usually comprising a train of synchronizing pulses.

In the usual television receiver, currents or voltages of saw-toothed wave form are employed for deflecting the electron beam of the picture tube so that the beam will trace out the lines of which the television picture is composed. In conventional American television receivers, the horizontal scanning signal is at a frequency of 15,750 cycles per second, while the vertical scanning signal is at a frequency of 60 cycles per second. The horizontal and vertical scanning signals are generated locally in the television receiver by means of horizontal and vertical sweep generators. These generators must be synchronized with the horizontal and vertical synchronizing pulses transmitted by the television station. The present invention relates primarily to the synchronization of the horizontal sweep generator with the horizontal synchronizing pulses, but is also applicable to synchronization of the vertical sweep generator.

The horizontal synchronizing pulses are of extremely brief duration and are transmitted during the brief intervals between lines of the television picture.

The usual television receiver employs an electromagnetic deflection yoke having horizontal deflection coils which are supplied with deflection or sweep currents of saw-toothed wave form. The current wave form includes a rapid retrace or flyback portion in which the sweep current changes very rapidly so as to return the electron beam from one side of the screen to the other. The flyback is accompanied by a surge or pulse of voltage in the deflection coils and also in the transformer which normally supplies the deflection coils with saw-toothed current. In the usual receiver equipped with magnetic deflection, the flyback pulse is typically a voltage surge of considerable magnitude, on the order of several hundred volts. The duration of the flyback pulse is roughly of the same order of magnitude as the duration of the synchronizing pulses. When the local sweep circuit of the television receiver is functioning properly, the flyback pulses occur very nearly in synchronism with the synchronizing pulses.

Every television receiver must provide some means for synchronizing the horizontal and vertical sweep oscillators with the received horizontal and vertical synchronizing pulses. Different circuits have been developed for this purpose, varying greatly both in complexity and effectiveness.

Two principal systems of sweep oscillator synchronization are employed. One system involves direct triggering of the oscillator by the individual synchronizing pulses. That arrangement is simple and inexpensive, but it has the serious disadvantage that the oscillator can be triggered by any random noise pulse of an amplitude comparable to that of the synchronizing pulses. Thus, synchronizing circuits of this type are often seriously affected by random noise pulses, such as those produced by atmospheric static, lightning, engine ignitions and the like.

The other, more satisfactory system of sweep synchronization is the so-called "automatic frequency control" or AFC circuit. In that circuit, the frequency of the sweep oscillator is governed by the average frequency of the synchronizing pulses. The circuit detects any difference between the average frequency of the sweep oscillator and the average frequency of the synchronizing pulses, and corrects the sweep oscillator accordingly, so as to keep the oscillator in step with the synchronizing pulses. Such circuits are relatively insensitive to the effect of individual noise pulses. Improved and simplified AFC synchronizing circuits are disclosed and claimed in my prior patents, No. 2,742,591, patented April 17, 1956, and No. 2,795,644, patented June 11, 1957. Further improvements in such circuits are accomplished by the present invention.

One of the objects of the present invention is to provide an improved AFC synchronizing circuit which combines the advantage of being highly immune to the effects of noise pulses, with the ability to pull the sweep oscillator into synchronization despite wide variations in such factors as power line voltage, signal strength and temperature.

A further object of the present invention is to provide a new and improved synchronizing circuit which is effectively self-adjusting, so that the circuit readjusts itself if synchronization is lost, thus making it unnecessary for the human operator to readjust the circuit.

Another object is to provide a new and improved AFC synchronizing circuit having means whereby the frequency of the sweep oscillator is automatically scanned or varied if synchronization is lost, so that the circuit searches for and finds a new set of conditions under which synchronization can be maintained.

A further object is to provide a synchronizing circuit having an improved degree of stability over a wide range of variation of power supply voltage.

Further objects and advantages of the present invention will appear from the following description, taken with the accompanying drawings, in which.

Figure 1:
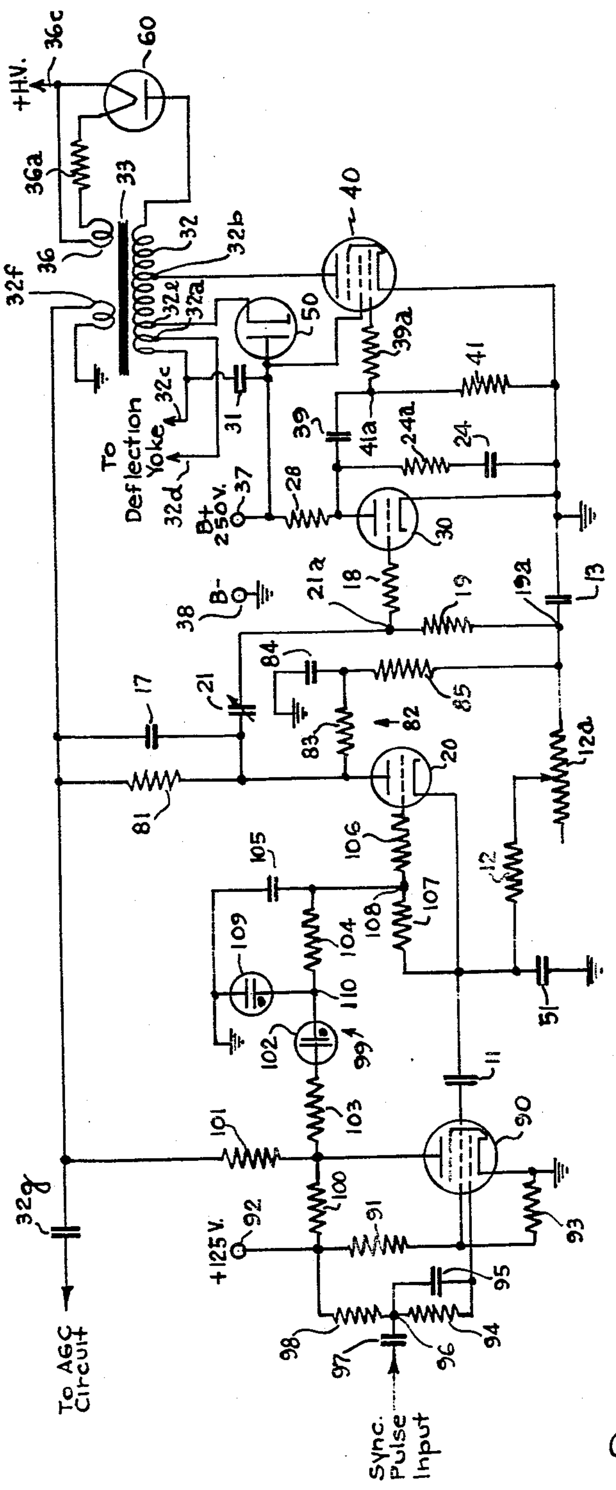
FIG. 1 is a schematic wiring diagram of an AFC synchronized sweep circuit to be described as an illustrative embodiment of the present invention.

The present invention is applicable generally to virtually all types of AFC synchronizing circuits, but will be described specifically with reference to an AFC synchronizing circuit of the general type disclosed and claimed in my prior Patent No. 2,795,644, patented June 11, 1957. Thus, it will be recognized that the circuit shown in FIG. 1 comprises the synchronizing tube or triode 20, the feedback triode 30, the driver pentode 40, the damper diode 50 and the high voltage rectifier diode 60 of the circuit shown in such patent. In the present circuit, these and other components corresponding to the components of the patented circuit will be given the same reference characters as in the patent. The synchronizing pulses are supplied to the cathode of the triode 20 through a coupling capacitor 11. A charge accumulating capacitor 51 is connected between the cathode 20 and ground, in much the same manner as in FIGS. 2 and 4 of such patent. It will be seen that an integrating circuit comprising a fixed resistor 12, a variable resistor 12*a*, and a capacitor 13, all connected in series, extends between the cathode of the triode 20 and ground.

The grid circuit of the triode 20 is somewhat modified, in accordance with the present invention, as will be described shortly in detail. However, the flyback pulses are applied to the plate of the triode 20 by means of a capacitor 17, as in the circuit of the patent.

Resistors 18 and 19 are connected in series between the grid of the feedback triode 30 and the junction point 19*a* between the resistor 12*a* and the capacitor 13. In this way, the bias developed at the junction 19*a* is applied to the grid of the triode 30 so as to control the frequency of the sweep oscillator circuit. A coupling capacitor 21 is connected between the plate of the triode 20 and the junction point 21*a* between the resistors 18 and 19. As in the case of the patented circuit, the capacitors 17 and 21 transmit the flyback pulses to the grid of the triode 30. The capacitors 17 and 21 and the resistor 19 constitute a differentiating circuit. For initial adjustment, the capacitor 21 may take the form of an adjustable trimmer.

In the illustrated circuit, the cathode of the triode 30 is connected to ground. A charge accumulating capacitor 24 is connected in series with a resistor 24*a* between the plate of the triode 30 and ground. A plate resistor 28 is connected between the plate of the triode 30 and a B+ terminal 37, which, for example, may be supplied with 250 volts. The B— terminal 38 may be connected directly to ground.

It will be seen that a coupling capacitor 39 is connected in series with a resistor 39*a* between the plate of the triode 30 and the control grid of the driver pentode 40. A grid leak resistor 41 is connected between ground and the junction 41*a* between the capacitor 39 and the resistor 39*a*. The cathode of the driver 40 is directly grounded. It will be seen that the screen grid of the driver 40 is connected directly to the B+ terminal 37.

In accordance with the usual practice, the driver 40 supplies its output to a transformer 33 which is employed to provide the saw-toothed deflection current for the yoke of the picture tube. Thus, the transformer 33 has a main winding 32. Leads 32*c* and 32*d* are provided to connect the horizontal deflection yokes (not shown) between one end of the winding 32 and a tap 32*a* on the winding. The plate of the driver pentode 40 is connected to another tap 32*b* on the winding 32. The opposite end of the winding 32 is connected to the plate of the high-voltage rectifier 60. The filament of the rectifier 60 is connected across a secondary winding 36 on the transformer 33, in series with a current-limiting resistor 36*a*. One side of the rectifier filament is connected to a lead 36*c* which supplies the positive high voltage to the main accelerating anode of the picture tube, in accordance with the usual arrangement.

The plate of the damper diode 50 is connected to the B+ terminal 37, while the cathode of the diode 50 is connected to a tap 32*e* on the winding 32. A capacitor 31 is connected between the end of the winding and the plate of the damper diode 50.

In this case, the flyback pulses are supplied to the capacitor 17 by a seperate secondary winding 32*f* on the transformer 33. This winding 32*f* may also be employed in connection with the automatic gain control (AGC) circuit of the television receiver. As shown, one side of the winding 32*f* is grounded. The capacitor 17 is connected between the other side of the winding 32*f* and the plate of the triode 20. A capacitor 32*g* may be employed to supply the flyback pulses to the AGC circuit.

The circuit, as thus far described, is basically the same circuit as disclosed and claimed in my Patent No. 2,795,644. The illustrated circuit embodies improvements to increase the stability of the circuit with respect to variations in the power line voltage. For this purpose, a resistor 81 is connected across the capacitor 17 between the flyback winding and the plate of the triode 20. An integrating circuit 82 is connected between the plate of the triode 20 and ground. This integrating circuit 82 comprises a resistor 83 in series with a capacitor 84. Thus, the flyback pulses develop an integrated voltage across the capacitor 84. This voltage is applied to the control point 19*a* through a resistor 85, connected between the point 19*a* and the junction between the resistor 83 and the capacitor 84. The current supplied by the resistor 85 affects the bias on the triode 30 in such a way as to stabilize the circuit against variations in the power line voltage, so that such variations have very little effect upon the frequency of the sweep generating circuit.

It has already been indicated that the synchronizing pulses are supplied to the cathode of the control triode by the capacitor 11. The synchronizing pulses are derived from an amplifier pentode 90 which may function in much the same manner as a conventional saturated grid synchronizing pulse clipper. However, the connections of the pentode 90 are modified so as to embody various features of the present invention. In order that the plate circuit of the pentode 20 may be employed for the purposes of the present invention, the coupling capacitor 11 is connected between the screen grid of the pentode 90 and the cathode of the triode 20. The screen grid of the pentode 90 receives its operating voltage through a load resistor 91 which is connected between the screen grid and a positive power supply terminal 92. A positive potential such as 125 volts may be supplied to the terminal 92. A resistor 93 may be connected between the screen grid of the pentode 90 and ground. As shown, the cathode of the pentode 90 is connected directly to ground.

The parallel combination of a grid leak resistor 94 and a capacitor 95 is connected between the control grid of the pentode 90 and an input point 96. Horizontal synchronizing pulses are supplied to the point 96 through a coupling capacitor 97. Bias is supplied to the grid of the pentode 90 by means of a resistor 98 connected between the point 96 and the positive power supply terminal 92.

The plate of the pentode 90 is provided with a circuit 99 whereby the sweep oscillator is self-adjusting in case synchronization is lost. It will be seen that operating voltage is supplied to the plate of the pentode by a resistor 100, connected between the plate and the positive terminal 92. The flyback pulses are applied to the plate of the pentode 90 by a resistor 101 connected between the plate and the ungrounded side of the secondary winding 32*f* on the flyback transformer 33. When synchronization is lost, the self-adjusting action of the circuit is instituted by a breakdown diode 102, illustrated as a neon or other gas tube. A resistor 103 is connected between the plate of the pentode 90 and one side of the neon tube 102. The other side of the neon tube 102 is connected to a resistor 104 and thence through a capacitor 105 to ground. When synchronization is lost, the neon tube 102 will break down, so that the capacitor 105 will be charged through the neon tube 102 and the resistors 103 and 104. The resulting voltage across the capacitor 105 is applied to the grid of the triode 20 through a resistor 106. A grid leak resistor 107 is connected between the cathode of the triode 20 and the junction 108 between the capacitor 105 and the resistor 106. The rising voltage across the capacitor 105 varies the frequency of the sweep oscillator so that the oscillator seeks a new condition of synchronization. To limit the voltage across the capacitor 105, a second breakdown diode 109, illustrated as a neon or other gas tube, is connected between ground and the junction 110 between the neon tube 102 and the resistor 104. Thus, if the voltage at the junction 110 rises to a sufficient value, the neon tube 109 will break down so that the capacitor 105 will discharge through the resistor 104 and the neon tube 109. As a result, the voltage across the capacitor 105 will drop to a low value so as to shift the sweep oscillator to a new frequency which will serve as a new starting point for the search for a condition of synchronization. As soon as the synchronized condition has been achieved, the voltage at the plate of the pentode 90 will drop to such a low value that the neon tubes 102 and 109 will cease to conduct. Thus, the synchronized condition will be maintained.

It has already been indicated that the neon tube 102 will break down only when synchronization is lost. This is due to the fact that the tube 90, particularly in its plate circuit, serves as a coincidence detector, to determine whether or not the flyback pulses coincide with the synchronizing pulses. When such coincidence exists, the plate of the pentode 90 presents such a low impedance to the flyback pulses that the flyback pulses are incapable of breaking down the neon tube 102. When synchronization is lost, the flyback pulses no longer coincide with the synchronizing pulses, so that the plate of the pentode 90 presents a high impedance to the flyback pulses. As a result, the high voltage flyback pulses are effective to break down the neon tube 102. As already indicated, the current through the neon tube 102 charges the capacitor 105 and shifts the bias of the tube 20 so as to initiate a search for a new condition of synchronization. Normally, the time constants of the circuit are such that the entire range of self-adjustment is covered in a brief interval, such as one-tenth of a second. Thus, the new condition of synchronization is located so quickly that the observer hardly notices the momentary loss of synchronization. The self-adjusting action of the circuit obviates any need for the operator to adjust the circuit to a new condition of synchronization.

The variable resistor 12*a* and the adjustable trimmer capacitor 21 provide means whereby the sweep oscillator may be adjusted initially at the factory for best operation, in accordance with the individual ionization and deionization characteristics of the neon tubes 102 and 109, particularly the latter. Neon tubes, as commercially manufactured, exhibit considerable variations in the voltage at which the tube ionizes or breaks down into conduction, and also in the voltage at which the tube deionizes. Initially, the resistor 12*a* and the trimmer capacitor 21 are adjusted so that the voltage at the junction 108 is midway between the ionization and deionization voltages of the neon tube 109. This adjustment is made while the sweep oscillator is running in synchronism with a normal test signal, known to be operating at the desired horizontal sweep frequency, usually 15.75 kilocycle. While the television receiver is being adjusted, it should be supplied with the normal power line voltage, usually 117 volts.

Figure 2:
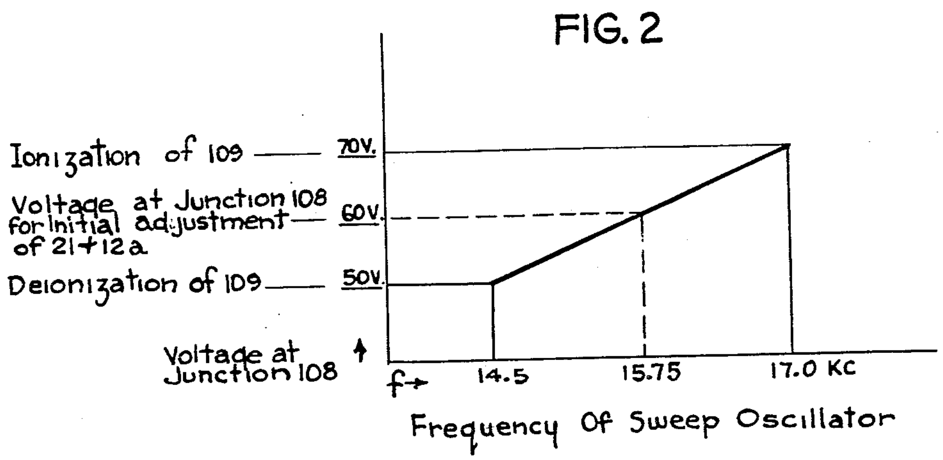
FIG. 2 is a graph illustrating the operation and initial adjustment of the circuit of FIG. 1.

The initial adjustment of the horizontal sweep oscillator is illustrated in FIG. 2. The graph shown in this figure is based on the assumption that the neon tube 109 ionizes at 70 volts and deionizes at 50 volts. Thus, the variable resistor 12*a* and the trimmer capacitor 21 are adjusted so that the voltage at the point 108 is 60 volts, and so that the sweep oscillator is running in perfect synchronization with a test signal at 15.75 kc. When synchronization is lost during the operation of the sweep circuit, the neon tube 102 becomes conductive so that the capacitor 105 is charged to a higher voltage. Thus, the voltage at the point 108 rises above its initial value. This tends to increase the frequency of the sweep oscillator, as indicated by the graph of FIG. 2. In some cases, a slight increase will restore synchronization. In other cases, the voltage at the point 108 will rise to the breakdown or ionization voltage of the neon tube 109, thus causing the frequency of the sweep oscillator to rise to perhaps 17 kc. At this voltage, the neon tube 109 will break down into conduction so that the capacitor 105 will discharge through the neon tube 109. The voltage at the point 108 will then drop until the neon tube 109 deionizes, which will occur at about 50 volts. At this voltage, the sweep oscillator will be operating at a lower frequency of perhaps 14.5 kc. Due to the recharging of the capacitor 105 through the neon tube 102, the voltage at the point 108 will rise until perfect synchronization is achieved.

Figure 3:
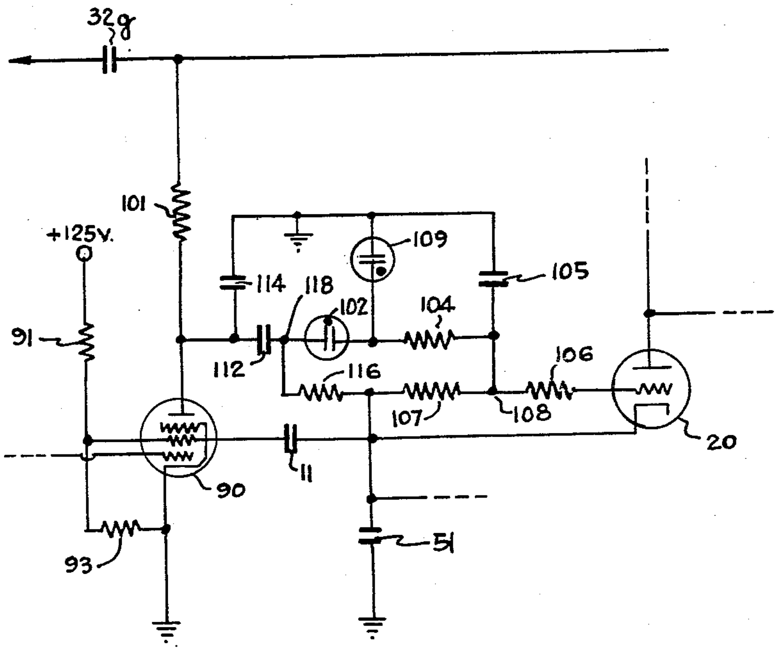
FIG. 3 is a fragmentary schematic wiring diagram illustrating a modified version of the circuit of FIG. 1.

FIG. 3 illustrates a modified self-adjusting circuit which may be substituted for the corresponding portion of the circuit of FIG. 1. Except as specifically described and illustrated, the modified arrangement of FIG. 3 may be the same as the circuit of FIG. 1.

In the modified circuit of FIG. 3, the coupling resistor 103 is replaced by a coupling capacitor 112 which thus supplies the flyback pulses from the plate of the pentode 90 to the neon tube 102. A small integrating capacitor 114 is connected between the plate of the pentode 90 and ground. It will be seen that a leak resistor 116 is connected between the cathode of the triode 20 and the junction 118 between the neon tube 102 and the capacitor 112. In the circuit of FIG. 3, the resistor 100 of FIG. 1 is omitted, so that the plate of the pentode 90 receives its voltage solely from the flyback winding 32*f* through the resistor 101.

The operation of the circuit of FIG. 3 is similar to that of the circuit of FIG. 1. As long as synchronization is maintained, the flyback pulses coincide with the synchronizing pulses so that the impedance at the plate of the pentode 90 is low. Thus, the voltage of the flyback pulses at the plate of the pentode 90 is insufficient to break down the neon tube 102. If synchronization is lost, the magnitude of the flyback pulses at the plate of the pentode 90 increases greatly. The pulses are supplied to the neon tube 102 through the capacitor 112 and are effective to cause conduction in the neon tube 102, with the result that the capacitor 105 is charged to a progressively higher voltage. This begins the search for a new condition of synchronization. If the rising voltage across the capacitor 105 does not restore synchronization, the neon tube 109 breaks down so as to allow the capacitor 105 to discharge through the neon tube 109 to a lower voltage at which the neon tube 109 deionizes. The capacitor 105 is then recharged through the neon tube 102 until synchronization is restored.

In effect, the circuit of FIG. 3 employs capacitive or A.C. coupling, while the circuit of FIG. 1 utilizes resistive or D.C. coupling. It has been found that the circuit of FIG. 3 generally provides a wider range of compensation for variations in line voltage and component values.

The breakdown devices 102 and 109 are illustrated as neon tubes, but it will be understood that solid state diodes or other suitable breakdown devices may be employed. The breakdown devices should have the characteristic of being substantially nonconductive below a particular breakdown voltage. However, once conduction in the breakdown device has been established, the device should remain conductive until the voltage across the device is reduced to a particular dropout voltage, lower than the breakdown voltage, at which conduction through the device is extinguished.

The values of the circuit components may be varied by those skilled in the art so as to accommodate various tube types, operating voltages, and other factors and conditions. Without limiting my invention, and purely to illustrate a typical design, however, I have found the following values to be satisfactory:

| Circuit element: | Value |
|---|---|
| 11 | 200 mmf. |
| 12 | 150,200 ohms. |
| 12a | 200,000 ohms (adjustable). |
| 13 | 1,000 mmf. |
| 17 | .01 mf. |
| 18 | 33,000 ohms. |
| 19 | 270,000 ohms. |
| 21 | 50–500 mmf. (trimmer). |
| 24 | 680 mmf. |
| 24a | 15,000 ohms. |
| 28 | 100,000 ohms. |
| 31 | .022 mf. |
| 32g | .001 mf. |
| 36a | 1 ohm. |
| 39 | .003 mf. |
| 39a | 100 ohms. |
| 41 | 1 megohm. |
| 51 | .001 mf. |
| 81 | 220,000 ohms. |
| 83 | 680,000 ohms. |
| 84 | .047 mf. |
| 85 | 22,000 ohms. |
| 91 | 39,000 ohms. |

| Circuit element: | Value |
|---|---|
| **93** | 56,000 ohms. |
| **94** | 100,000 ohms. |
| **95** | 470 mmf. |
| **97** | .003 mf. |
| **98** | 12 megohms. |
| **100** | 500,000 ohms. |
| **101** | 560,000 ohms. |
| **103** | 150,000 ohms. |
| **104** | 56,000 ohms. |
| **105** | .1 mf. |
| **106** | 220,000 ohms. |
| **107** | 3.3 megohms. |
| **112** | 10 mmf. |
| **114** | 10 mmf. |
| **116** | 3.9 megohms. |

Various modifications, alternative constructions and equivalents may be employed without departing from the true spirit and scope of the invention, as exemplified in the foregoing description and defined in the following claims.

I claim:

1. A television synchronizing circuit,
comprising a local oscillator for generating a sweep signal,
a control stage for adjusting the frequency of said local oscillator in accordance with the frequency of a train of synchronizing pulses,
said control stage having means responsive to variations in a bias voltage at a control point for changing the frequency of said local oscillator,
said local oscillator having means for generating flyback pulses,
a coincidence detector having first input means for receiving the flyback pulses and second input means for receiving the synchronizing pulses,
said coincidence detector being effective to supply a low output when coincidence exists between said flyback and synchronizing pulses while supplying a high output when such coincidence does not exist,
a bias changing circuit connected to said coincidence detector and including a first breakdown device,
a capacitor adapted to be charged through said first breakdown device,
and a second breakdown device for discharging said capacitor,
and means for supplying the voltage across said capacitor to said control point of said control stage,
said first breakdown device being effective to break down into a conductive state in response to the increased output from said coincidence detector when coincidence ceases to exist between said flyback and synchronizing pulses, so as to change the bias on said control stage.

2. A synchronizing circuit,
comprising a local oscillator,
a coincidence detector,
means for supplying local pulses from said local oscillator to said coincidence detector,
means for supplying received synchronizing pulses to said coincidence detector,
said coincidence detector being effective to supply an increased output when coincidence is lost between said local pulses and said synchronizing pulses,
a breakdown device connected to said coincidence detector and adapted to break down in response to said increased output when coincidence is lost,
means connected to said breakdown device and effective to produce a progressively changing bias voltage in response to the breakdown of said breakdown device,
and means for supplying said progressively changing biasing voltage to said local oscillator for progressively shifting the frequency thereof until coincidence between said local pulses and said synchronizing pulses is restored.

3. A synchronizing circuit,
comprising a local oscillator for generating local pulses,
a coincidence detector including an electron tube having a cathode,
a grid and a plate,
impedance means for supplying the local pulses from said local oscillator to said plate,
means for supplying received synchronizing pulses between said grid and said cathode,
said plate presenting a substantially increased impedance to said local pulses when coincidence is lost between said local pulses and said synchronizing pulses,
a first gas tube connected to said plate and adapted to be broken down into conduction by said local pulses on said plate when coincidence is lost,
a capacitor adapted to be charged through said first gas tube,
a second gas tube for discharging said capacitor in response to a predetermined increase of voltage across said capacitor,
and control means for varying the frequency of said local oscillator in response to the varying voltage across said capacitor to restore coincidence between said local and said synchronizing pulses.

4. A television synchronizing circuit,
comprising a local oscillator for generating a sweep signal,
a control stage for adjusting the frequency of said local oscillator in accordance with the frequency of a train of synchronizing pulses,
said control stage having means responsive to variations in a bias voltage at a control point for changing the frequency of said local oscillator,
said local oscillator having means for generating flyback pulses,
a coincidence detector having first input means for receiving the flyback pulses and second input means for receiving the synchronizing pulses,
said coincidence detector being effective to supply a low output when coincidence exists between said flyback and synchronizing pulses while supplying a high output when such coincidence does not exist,
a bias changing circuit connected to said coincidence detector and including a first gas tube,
a capacitor adapted to be charged through said first gas tube,
a second gas tube for discharging said capacitor,
and means for supplying the voltage across said capacitor to said control point of said control stage,
said first gas tube being effective to break down into a conductive state in response to the increased output from said coincidence detector when coincidence ceases to exist between said flyback and synchronizing pulses, so as to change the bias on said control stage.

5. A television synchronizing circuit,
comprising a local oscillator for generating a sweep signal,
a control stage for adjusting the frequency of said local oscillator in accordance with the frequency of a train of synchronizing pulses,
said control stage having means responsive to variations in a bias voltage at a control point for changing the frequency of said local oscillator,
said local oscillator having means for generating flyback pulses,
a coincidence detector having first input means for receiving the flyback pulses and second input means for receiving the synchronizing pulses,
said coincidence detector being effective to supply a low output when coincidence exists between said flyback and synchronizing pulses while supplying a high output when such coincidence does not exist,
a bias changing circuit connected to said coincidence detector and including a gas tube for receiving the output therefrom,
a capacitor adapted to be charged through said gas tube,
and means for supplying the voltage across said capacitor to said control point of said control stage,
said gas tube being effective to break down into a conductive state in response to the increased output from said coincidence detector when coincidence ceases to exist between said flyback and synchronizing pulses, so as to change the bias on said control stage.

6. A synchronizing circuit,
comprising a local oscillator,
a coincidence detector,
means for supplying local pulses from said local oscillator to said coincidence detector,
means for supplying received synchronizing pulses to said coincidence detector,
said coincidence detector being effective to supply an increased output when coincidence is lost between said local pulses and said synchronizing pulses,
a gas tube connected to said coincidence detector and adapted to break down in response to said increased output when coincidence is lost,
means connected to said gas tube and effective to produce a progressively changing bias voltage in response to the breakdown of said gas tube,
and means for supplying said progressively changing biasing voltage to said local oscillator for progressively shifting the frequency thereof until coincidence between said local pulses and said synchronizing pulses is restored.

7. A synchronizing circuit,
comprising a local oscillator for generating local pulses,
a coincidence detector including an electron tube having a cathode,
a grid and a plate,
impedance means for supplying the local pulses from said local oscillator to said plate,
means for applying received synchronizing pulses between said grid and said cathode,
said plate presenting a substantially increased impedance to said local pulses when coincidence is lost between said local pulses and said synchronizing pulses,
a gas tube connected to said plate and adapted to be broken down into conduction by said local pulses on said plate when coincidence is lost,
a capacitor adapted to be charged through said gas tube,
and control means for varying the frequency of said local oscillator in response to the varying voltage across said capacitor to restore coincidence between said local and said synchronizing pulses.

8. A synchronizing circuit,
comprising a local oscillator for generating local pulses to be synchronized with received synchronizing pulses,
an automatic frequency control system for receiving the synchronizing pulses and controlling the frequency of said local oscillator in accordance with the frequency of the synchronizing pulses,
said automatic frequency control system having a bias circuit in which a variable bias is developed to vary the frequency of said local oscillator,
a coincidence detector,
means for supplying the local pulses from said local oscillator to said coincidence detector,
means for supplying the received synchronizing pulses to said coincidence detector,
said coincidence detector being effective to supply an increased output when coincidence is lost between said local pulses and said synchronizing pulses,
a breakdown device connected to said coincidence detector and adapted to break down in response to said increased output when coincidence is lost,
means connected to said breakdown device and effective to produce a progressively changing bias voltage in response to the breakdown of said breakdown device,
and means for supplying said progressively changing biasing voltage to said bias circuit for progressively shifting the frequency of said local oscillator until coincidence between said local pulses and said synchronizing pulses is restored.

9. A synchronizing circuit,
comprising a local oscillator for generating local pulses,
a coincidence detector including an electron tube having a cathode,
a grid and a plate,
impedance means for supplying the local pulses from said local oscillator to said plate,
means for applying received synchronizing pulses between said grid and said cathode,
said plate presenting a substantially increased impedance to said local pulses when coincidence is lost between said local pulses and said synchronizing pulses,
resistive coupling means connected to said plate,
a gas tube connected to said resistive coupling means and adapted to be broken down into conduction by said local pulses received from said plate through said resistive coupling means when coincidence is lost,
a capacitor connected to said gas tube and adapted to be charged therethrough,
and control means for varying the frequency of said local oscillator in response to the varying voltage across said capacitor to restore coincidence between said local and synchronizing pulses.

10. A synchronizing circuit,
comprising a local oscillator for generating local pulses,
a coincidence detector including an electron tube having a cathode,
a grid and a plate,
impedance means for supplying the local pulses from said local oscillator to said plate,
means for applying received synchronizing pulses between said grid and said cathode,
said plate presenting a substantially increased impedance to said local pulses when coincidence is lost between said local pulses and said synchronizing pulses,
capacitive coupling means connected to said plate,
a gas tube connected to said capacitive coupling means and adapted to be broken down into conduction by said local pulses received from said plate through said capacitive coupling means when coincidence is lost,
a capacitor connected to said gas tube and adapted to be charged therethrough,
and control means for varying the frequency of said local oscillator in response to the varying voltage across said capacitor to restore coincidence between said local and synchronizing pulses.

11. A television synchronizing circuit,
comprising a local sweep oscillator including means for generating flyback pulses,
an automatic frequency control stage for adjusting the frequency of said local oscillator to keep said local oscillator in step with a train of synchronizing pulses,
said control stage having a first input for receiving said synchronizing pulses and a phase discriminator said flyback pulses and a second input for receiving for adjusting the frequency of said oscillator in response to any difference between the phases of said flyback and synchronizing pulses so as to counteract any such difference, said control stage having a bias input terminal and means responsive to variations in the voltage at said terminal for changing the frequency of said local oscillator, a coincidence detector having first input means for receiving the flyback pulses and second input means for receiving the synchronizing pulses, said coincidence detector being effective to supply a first output when coincidence exists between said flyback and synchronizing pulses while supplying a second different output when such coincidence does not exist, and a search signal generator connected between said coincidence detector and said bias terminal of said control stage and effective to produce a progressively changing search signal at said bias terminal in response to said second output of said coincidence detector, said search signal generator being prevented from producing said changing search signal when said coincidence detector is producing said first output, said progressively changing search signal being effective to cause said automatic frequency control stage to vary the frequency of said local oscillator through a predetermined range until coincidence is restored.

12. A television synchronizing circuit, comprising a local sweep oscillator including means for generating flyback pulses, an automatic frequency control stage for adjusting the frequency of said local oscillator to keep said local oscillator in step with a train of synchronizing pulses, said control stage having a first input for receiving said flyback pulses and a second input for receiving said synchronizing pulses, said control stage including a phase discriminator connected to said first and second inputs and having an output circuit connected to said local oscillator for supplying said local oscillator with a control signal corresponding to any difference between the phases of said flyback and said synchronizing pulses so as to counteract any such difference, and an additional stabilizing circuit connected between said first input and said output circuit and including integrating means for integrating said flyback pulses and adding a component to said control signal corresponding to the integrated magnitude of said flyback pulses so as to stabilize the synchroniizing circuit against suply voltage variations.

References Cited in the file of this patent

UNITED STATES PATENTS 2,795,644 Procter ---------------- June 11, 1957